United States Patent

Lu

[11] Patent Number: 6,067,241
[45] Date of Patent: *May 23, 2000

[54] DUAL-OUTPUT DC-DC POWER SUPPLY

[75] Inventor: Qun Lu, Lexington, Mass.

[73] Assignee: International Power Devices, Inc., Boston, Mass.

[*] Notice: This patent issued on a continued prosecution application filed under 37 CFR 1.53(d), and is subject to the twenty year patent term provisions of 35 U.S.C. 154(a)(2).

[21] Appl. No.: 09/016,074

[22] Filed: Jan. 30, 1998

Related U.S. Application Data

[62] Division of application No. 08/763,685, Dec. 11, 1996, Pat. No. 5,715,153.

[51] Int. Cl.[7] .................................................. H02M 00/00
[52] U.S. Cl. .............................................. 363/65; 363/146
[58] Field of Search .................................. 323/266, 267, 323/269, 271, 272; 363/65, 146; 307/12, 17, 33, 36, 37, 39

[56] References Cited

U.S. PATENT DOCUMENTS

| 3,723,850 | 3/1973 | Daniels et al. | 321/47 |
| 3,760,256 | 9/1973 | Rast, Jr. et al. | 323/282 |
| 4,628,426 | 12/1986 | Steigerwald | 363/21 |
| 4,680,688 | 7/1987 | Inou et al. | 363/174 |
| 4,733,104 | 3/1988 | Steigerwald et al. | 307/260 |
| 5,019,959 | 5/1991 | MacDonald et al. | 363/134 |
| 5,225,767 | 7/1993 | Gulczynski | 323/282 |
| 5,400,239 | 3/1995 | Caine | 363/67 |
| 5,541,828 | 7/1996 | Rozman | 363/21 |
| 5,663,874 | 9/1997 | Mader et al. | 363/21 |

*Primary Examiner*—Matthew Nguyen
*Attorney, Agent, or Firm*—Fish & Richardson P.C.

[57] ABSTRACT

A multi-output power supply having half-brick dimensions includes a forward converter circuit which receives a DC input voltage and in response to a first control signal generates a first DC output voltage at a first level; and a buck regulator circuit which receives the first DC output voltage from the forward converter circuit. In response to a second control signal, the buck regulator generates a second DC output voltage at a second level.

11 Claims, 10 Drawing Sheets

| FIG. 5A | FIG. 5B | FIG. 5C |

FIG. 5D

DUAL-OUTPUT DC-DC POWER SUPPLY

This application is a Division of U.S. Ser. No. 08/763,685, now U.S. Pat. No. 5,715,153.

BACKGROUND OF THE INVENTION

The invention relates to switching power supplies, and more particularly to multi-output DC—DC switching power supplies.

There are about fourteen basic topologies (basic block diagrams) commonly used to implement a switching power supply. Each topology has characteristics which make it a suitable candidate for use in a particular application.

One of the most fundamental switching power supply topologies is the "buck" converter or "step-down" switching regulator. The buck converter includes a switch, usually in the form of a transistor, whose "on" time is controlled so that a series of rectangular voltage pulses of adjustable width can be appropriately filtered to provide a well-regulated average DC output.

Other switching power supply topologies are better suited for use as DC—DC converters. A DC—DC converter is a device which converts a DC voltage at one level to a DC voltage at another level. The converter typically includes a transformer, having primary and secondary windings wound around a common magnetic core. By opening and closing the primary circuit for appropriate intervals, control over the energy transfer between the primary and secondary windings is accomplished. The transformer provides an alternating voltage whose amplitude can be adjusted by changing the number of turns of the primary and secondary windings. Moreover, the transformer provides DC isolation between the input and the output of the converter.

One of the most common DC—DC converter topologies is the forward converter. When the primary winding of the forward converter is energized by closing the primary circuit, energy is immediately transferred to the secondary winding.

Recently, in the field of switching power supplies, greater attention has been directed toward compactness, energy efficiency, and higher performance. As integrated circuits pack more features in smaller volumes, it becomes increasingly important that the size of the system's power supply also decreases. Moreover, the complexity of many systems have increased with different parts of the system's circuitry requiring different power supply voltages. Thus, power supply designers are faced with the problem of providing smaller power supplies with multiple outputs and better performance.

SUMMARY OF THE INVENTION

The invention features a multi-output power supply including independently-controlled forward and buck converters disposed within a housing having half-brick dimensions.

In one general aspect, the multi-output power supply includes a forward converter which receives a DC input voltage and generates a first DC output voltage; a first control circuit which controls the level of the first DC output voltage; a buck converter which receives the first DC output voltage and generates the second DC output voltage; a second control circuit which controls the level of the second DC output voltage; and a housing having half-brick dimensions, with the forward converter, the buck converter, the first control circuit and the second control circuit disposed within the housing.

The present invention combines a pair of independently controlled switching DC circuit topologies which can be disposed within a relatively compact housing having "half-brick" dimensions. Independent control of the forward and buck converters ensures that the outputs of each converter are well-regulated. The topologies are interconnected in a way to allow available output power to be flexibly distributed to each of the pair of voltage outputs.

Preferred embodiments include the following features. The multi-output power supply includes a synchronization circuit which ensures that a second control signal from the second control circuit is applied to the buck converter at substantially the same time a first control signal from the first control circuit is applied to the forward converter. The multi-output power supply also includes a voltage regulator circuit disposed within the housing and connected to the forward converter and buck converter to maintain the difference between the first DC output voltage and the second DC output voltage below a predetermined threshold value.

In another aspect of the invention, a multi-output power supply which generates first and second DC output voltages to respective loads includes a housing having half-brick dimensions and first and second pairs of voltage output terminals corresponding to the first and second DC output voltages, respectively. In a preferred embodiment, each of the voltage terminals of the first and second pair of voltage output terminals are adjacent to each other.

Because the terminal pins of each of the first and second pairs of output terminal pins are adjacent to each other, lead lengths associated with the physical layout of the circuit associated with each pair are reduced.

Other features and advantages of the invention will become apparent from the following description of the preferred embodiments and from the claims.

DESCRIPTION OF THE PREFERRED EMBODIMENTS

Figure 1A:
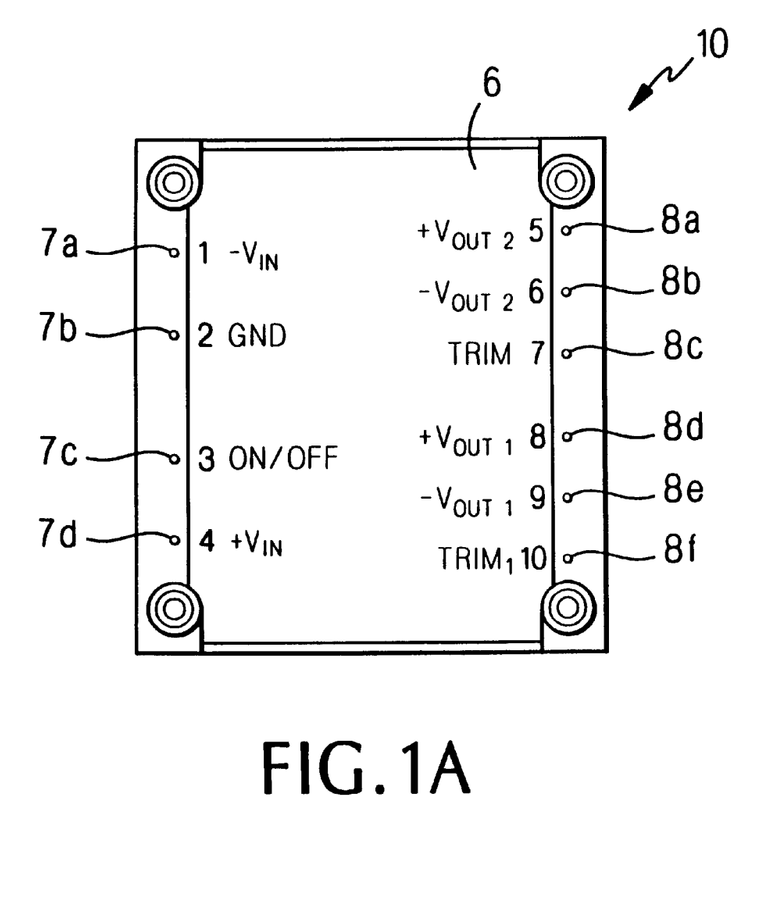
FIG. 1A is a plan view of the half-brick package enclosing the dual-output power supply.
Figure 1B:
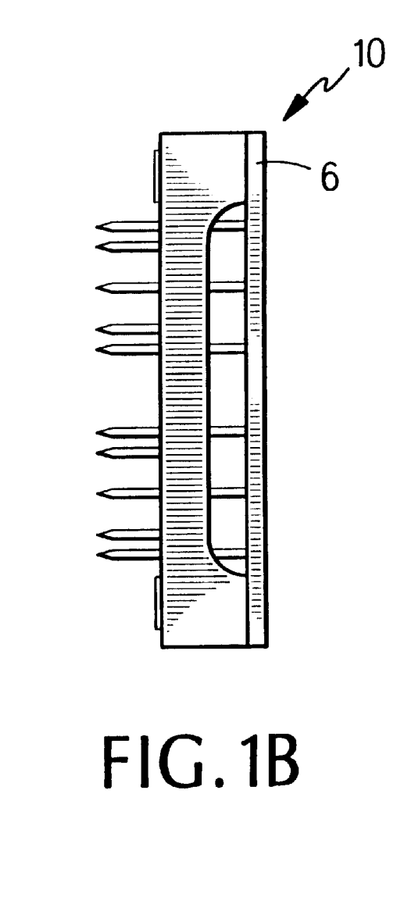
FIG. 1B is a side view of the half-brick package enclosing the dual-output power supply of FIG. 1A.

Referring to FIGS. 1A and 1B, a dual-output power supply 10 is provided within a molded package 6 having dimensions consistent with a standard "half-brick" module. A half-brick module has a width, depth and height of 2.28, 2.4 and 0.5 inches, respectively. As will be discussed in greater detail below, power supply 10 includes an isolated DC—DC forward converter in combination with a regulated buck converter for generating a pair of voltage outputs. Power supply 10 is capable of generating as much as 60 watts of output power to the pair of outputs.

Package 6 includes four input terminal pins 7a–7d including +$V_{in}$, –$V_{in}$, GND and remote ON/OFF pins. A relatively broad input voltage range between 34 and 75 volts can be applied to the +$V_{in}$ and –$V_{in}$ pins. Package 6 also includes six output pins 8a–8f including +$V_{out1}$, –$V_{out1}$, +$V_{out2}$, –$V_{out2}$, Trim 1 and Trim 2 pins. The terminal pins are grouped so that the +$V_{out1}$ and –$V_{out1}$ pins are adjacent to each other to ensure a short AC loop. Similarly, the +$V_{out2}$ and –$V_{out2}$ pins are positioned to be adjacent to each other. With this particular "pin out" arrangement, the physical layout of the circuits associated with each pair of outputs (described in greater detail below) are confined to a smaller area and lead lengths associated with each of the circuits are reduced. Minimizing the lead lengths reduces inductance associated with the physical layout of these lead lengths; thus, filtering at the pair of outputs is more efficient. Trim1 and trim2 pins allow the user to adjust the level of the output DC voltages from 90% to 110% of their factory settings.

Figure 2:
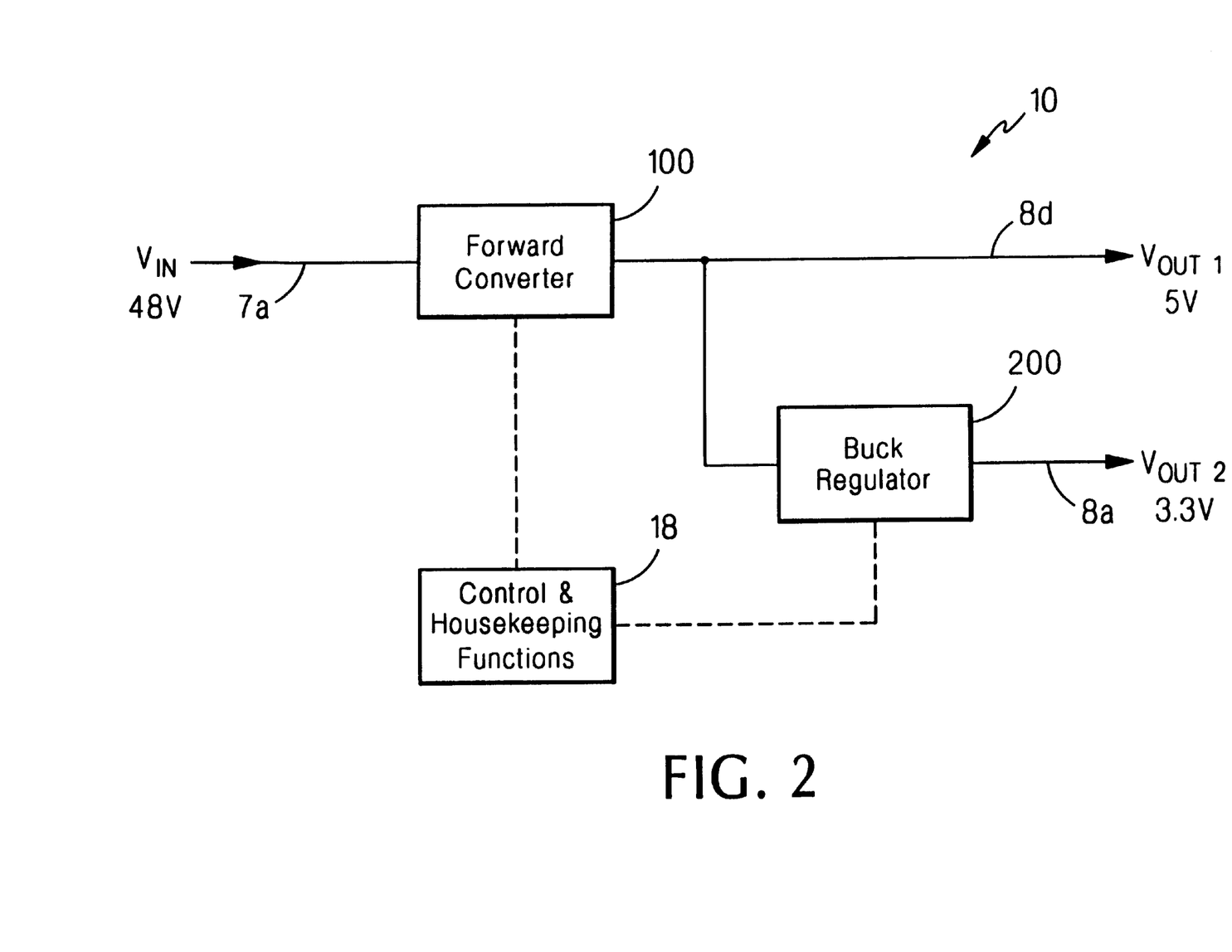
FIG. 2 is a functional block diagram of the dual-output power supply of the present invention.

Referring to FIG. 2, power supply 10 receives the DC input voltage (e.g., 48 V) at input terminal pin 7d (+$V_{in}$) and generates the DC output voltages of 5 V and 3.3 V, at output terminal pins 8d and 8a, respectively. Connected between input terminal pin 7d and output terminal pin 8d is a forward converter 100 which receives the DC input voltage and generates the first DC output voltage of 5 V to a first load (not shown). The first DC output voltage ($V_{out1}$) from forward converter 100 is also received by a buck converter 200 where it is stepped down to the second DC output voltage (3.3 V) provided to a second load (not shown) through output terminal pin 8a. Power supply 10 also includes control and housekeeping circuitry 18 for generating the necessary power to a number of auxiliary circuits needed to ensure proper functioning of power supply 10.

Figure 3A:
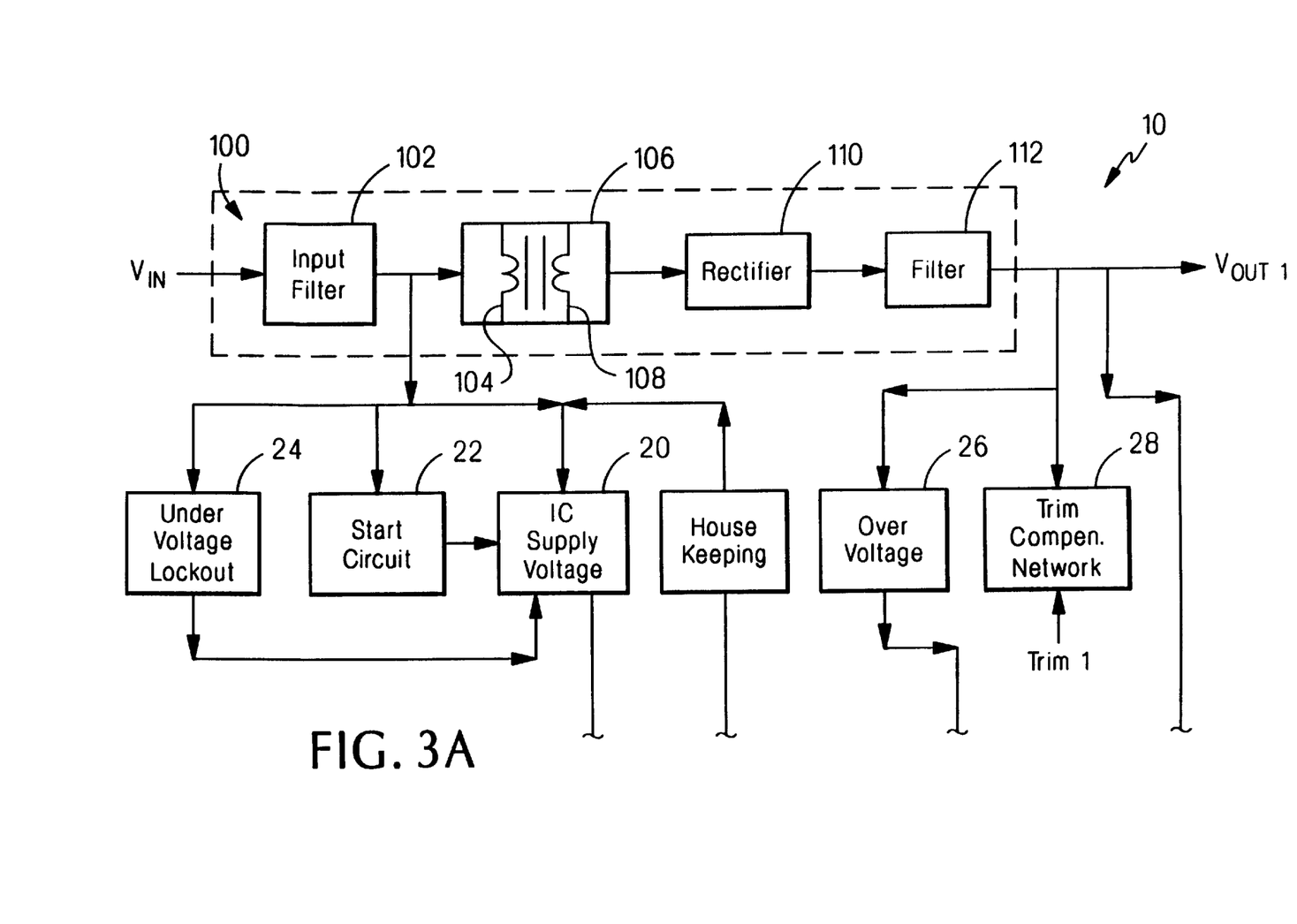
FIGS. 3A and 3B are a detailed block diagram of the dual-output power supply of FIG. 2.
Figure 3B:
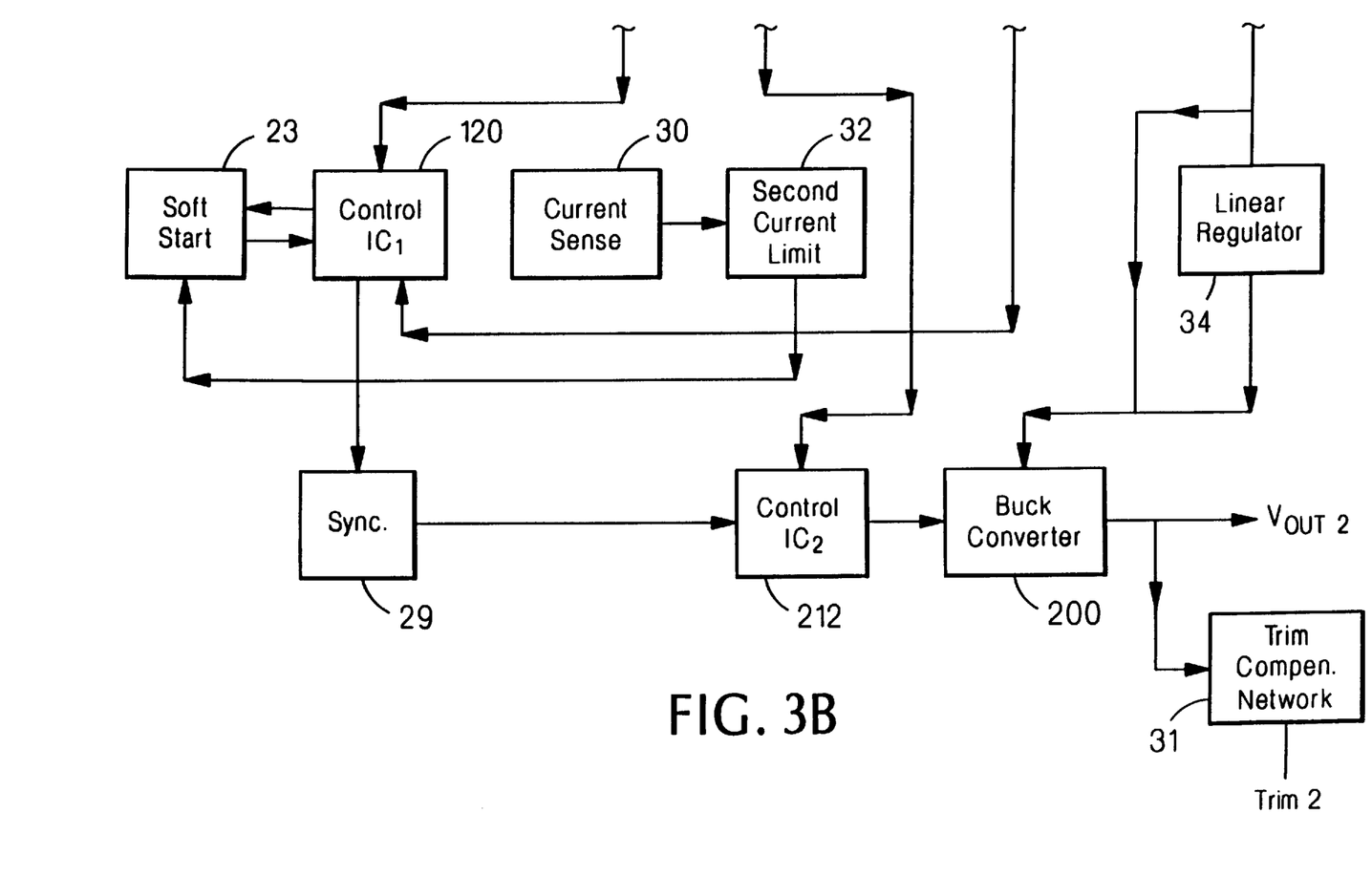

Referring to FIG. 3, the basic functional blocks diagram of dual-output power supply 10 are shown and will be described in greater detail below. Schematic representations of the circuitry used for each functional block of FIG. 3 are shown with like reference numerals in FIGS. 4 and 5 as dashed-line boxes.

Forward converter 100 includes an LC input filter 102 for smoothing the DC input voltage applied to input terminal pin 7a. The filtered voltage is received by a switched primary winding 104 of a transformer 106 with a secondary winding 108 of the transformer providing a series of AC pulses whose amplitudes are fixed by the ratio of the number of turns of the primary and secondary windings. An example of a transformer well-suited for use in the forward converter is described in co-pending application, Ser. No. 08/693,878, assigned to the assignee of the invention, and hereby incorporated by reference. The series of square-wave pulses are converted back to a rectified DC voltage using rectifier 110 and smoothed with an output filter 112.

Figure 4A:
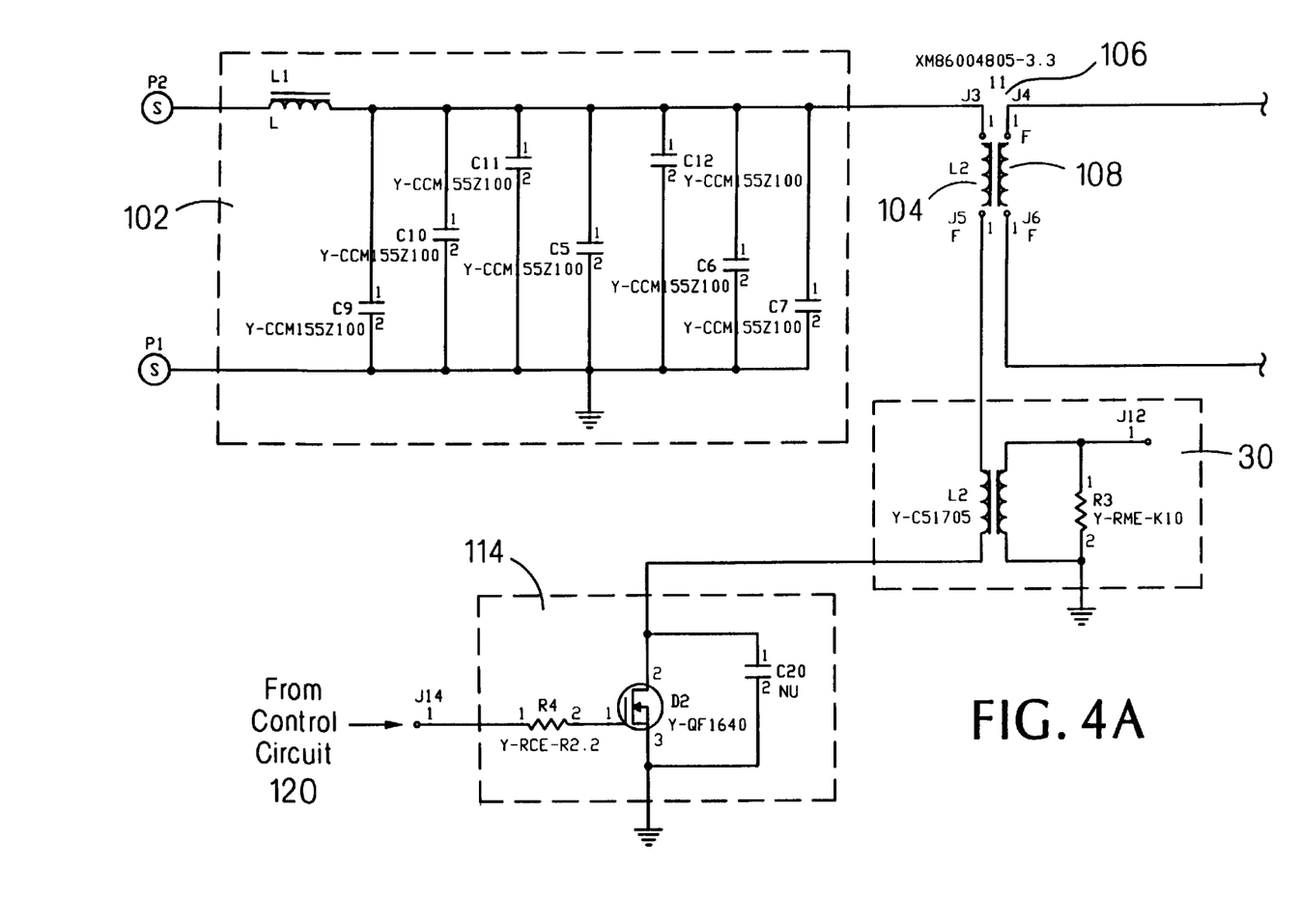
FIGS. 4A and 4B are a schematic representation of the forward converter and buck converter sections of the dual-output power supply of FIG. 3.
Figure 4B:
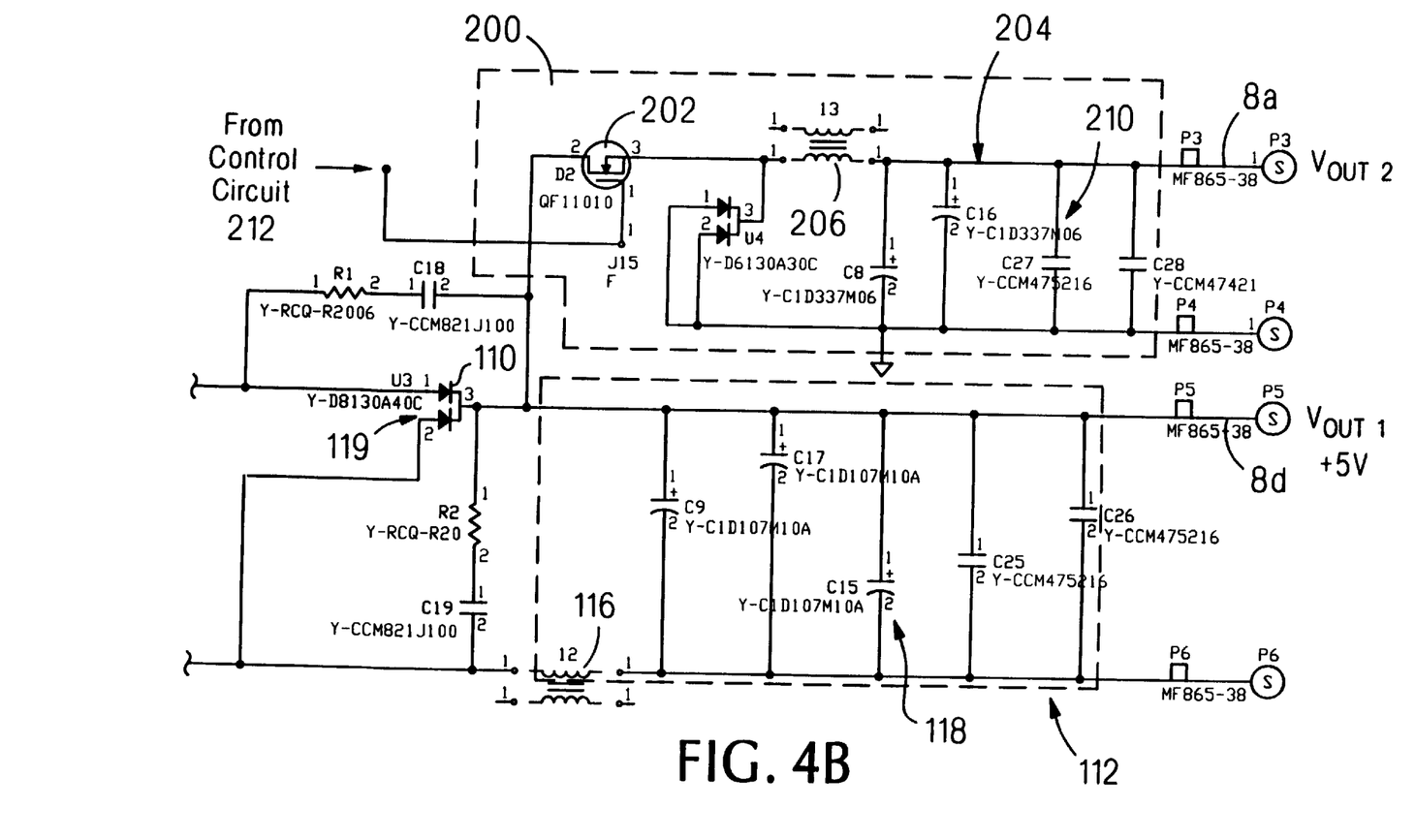
Figure 5A:
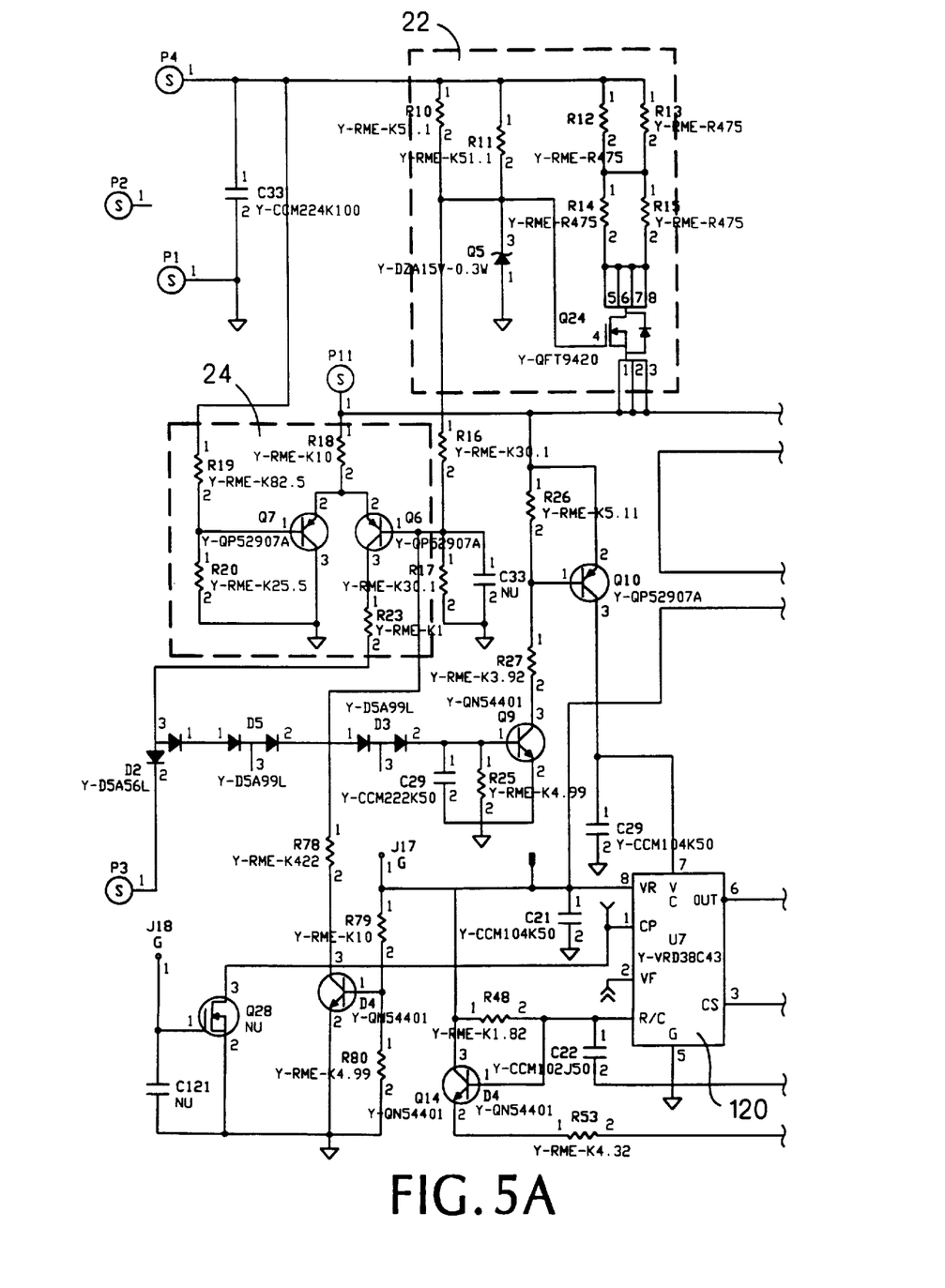
FIGS. 5A–5C are a detailed schematic representation of the control sections of the dual-output power supply of FIG. 3.
Figure 5B:
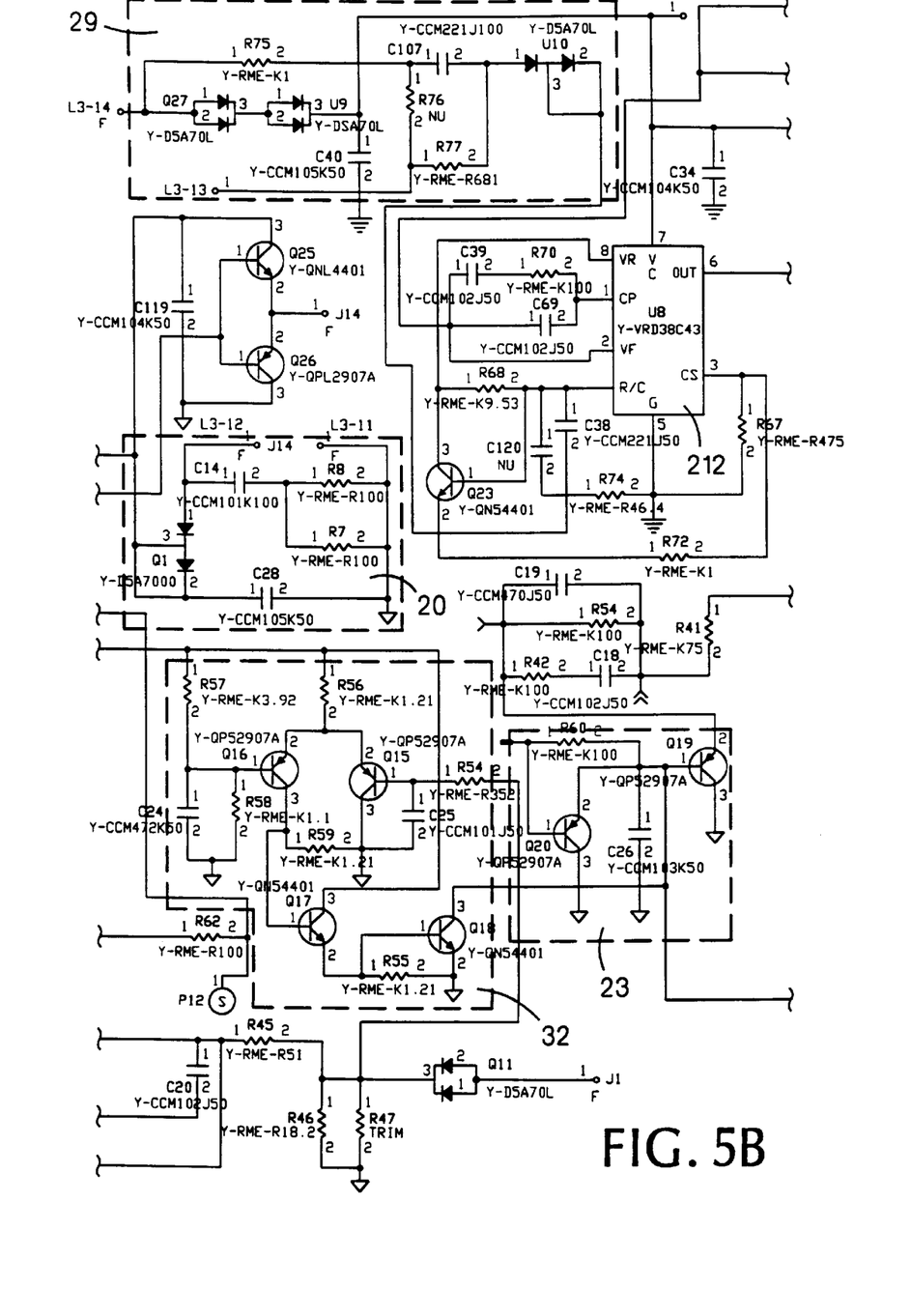
Figure 5C:
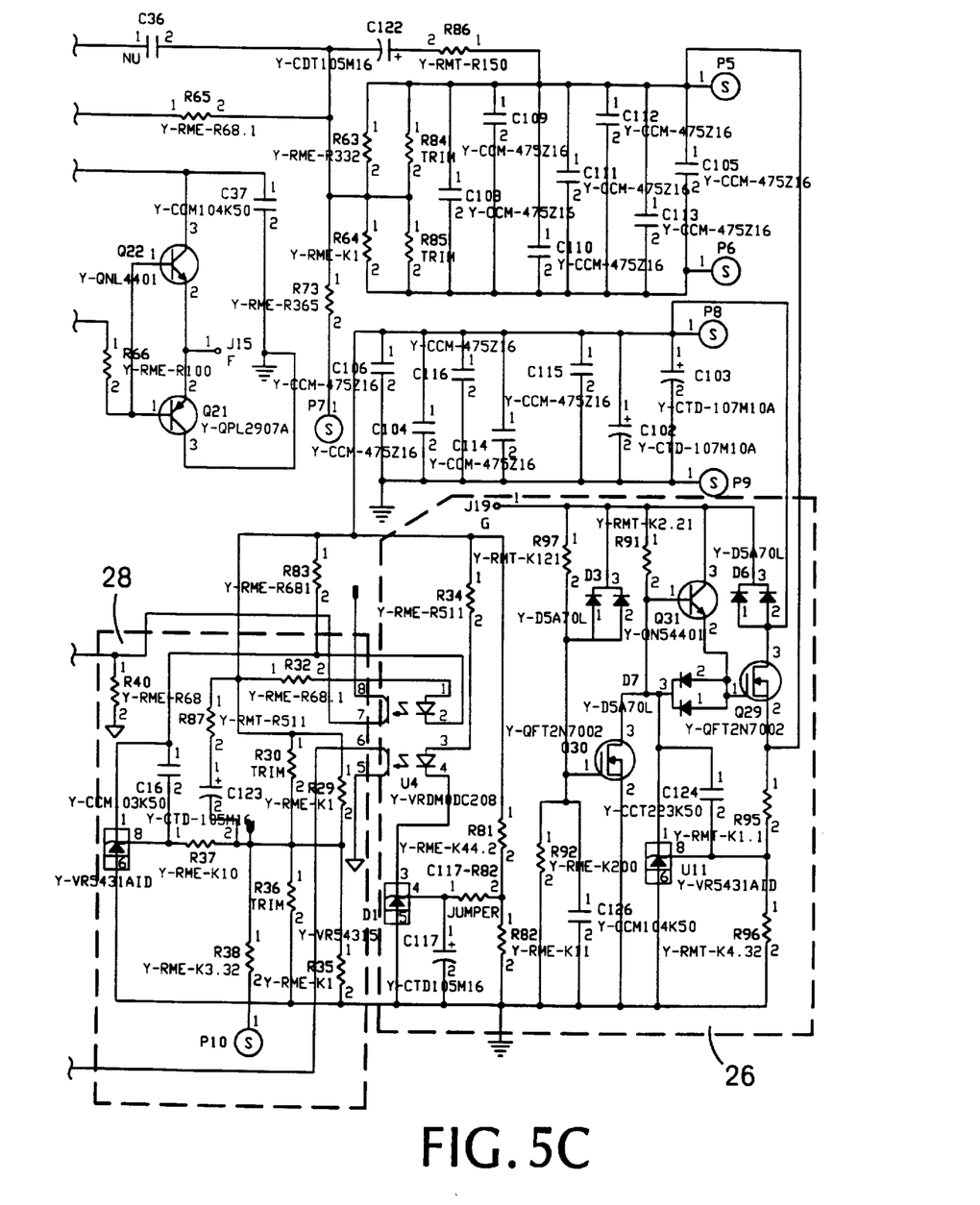
Figure 5D:
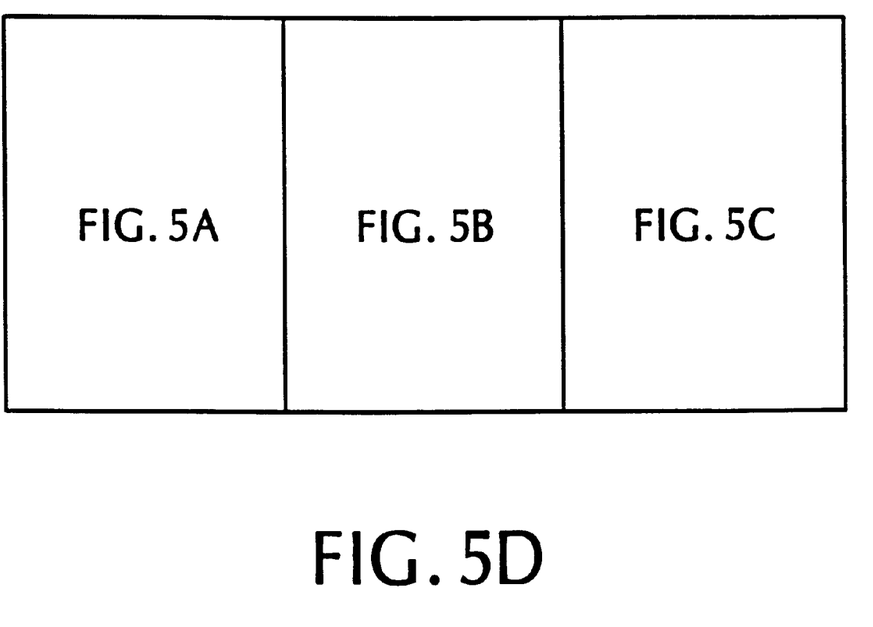
FIG. 5D is a diagram which displays the correct sequence of FIGS. 5A–5C.

Referring to FIG. 4, more particularly, a MOSFET transistor switch 114 is connected in series with the primary winding 104 of transformer 106. When switch 114 is closed, energy in primary winding 104 is transferred through a secondary winding 108 via rectifier 110 and output filter 112 to a load (not shown). Output filter 112 includes an inductive winding 116 of a transformer and a bank of capacitors 118. As will be discussed below, output filter 112 generates a $V_{out1}$ DC voltage (5 V) which is equal to the average of the duty-cycle-modulated raw DC input voltage. When switch 114 is opened, the forward energy transfer is stopped by a free-wheeling diode 116 which is connected in parallel with output filter 112 and allows the energy stored in inductive winding 116 of the filter to be released into capacitors 118.

Connected in parallel with output filter 114 of forward converter 100 is a buck converter 200 having a MOSFET transistor switch 202 which receives the $V_{out1}$ DC voltage from forward converter 100. Switch 202 is controlled to generate an adjustable duty cycle output voltage, $V_{out2}$ DC voltage (3.3 V), to an output filter 204 formed of an inductive winding 206 of a transformer 208 and a bank of capacitors 210.

Referring again to FIG. 3, dual-output supply 10 includes a control circuit 120 which controls the duty cycle of the pulse train applied to the gate of switching transistor 114, thereby controlling the level of the $V_{out1}$ DC voltage. When control circuit 120 is used in a constant frequency operation, the "chopping" period is kept constant and the "on" time is varied. Because the width of the pulse is being varied, this type of control is known as pulse width modulation (PWM) control. Alternatively, control circuit can be used in a variable frequency operation where the chopping frequency is varied with the "on" or "off" time being held constant. This type of control is called frequency modulation.

Buck converter 200 includes its own independent control circuit 212 which operates in the same way as control circuit 120 to control the duty cycle of the pulse train applied to the gate of switching transistor 202, thereby controlling the level of the $V_{out2}$ DC voltage.

A synchronization circuit 29 receives a timing signal from control circuit 120 which indicates when forward converter 100 is being switched. In response to the timing signal, synchronization circuit 29 generates a sync signal to control circuit 212 to ensure that the pulse trains for forward converter 100 and buck converter 200 are switched simultaneously. Switching the converters at the same time, minimizes the overall noise of the power supply by limiting any switching noise to the transition periods.

Because buck converter 200 is in a cascade arrangement with forward converter 100, two separate power trains are not required, thereby minimizing the space required for the two converters. Thus, both converters can be accommodated within the relatively small half-brick package 6 (FIGS. 1A and 1B). Moreover, the cascade arrangement of the buck and forward converters allows for greater flexibility in the distribution of the 60 watts of available power form the dual-output power supply. For example, in one application, the 5 V DC voltage ($V_{out1}$) generates 6A of current and the 3.3 V DC voltage ($V_{out2}$) generates 9A of current. However, in another application, the 60 watts of available power could be distributed so that the 5 V DC voltage generates about 8A of current and the 3.3 V DC voltage ($V_{out2}$) generates 6A of current.

Control and housekeeping circuitry 18 (FIG. 2) includes an IC voltage supply 20 for powering the components (e.g., MOSFET switch transistors) of the power train, as well as the control circuits and other auxiliary circuitry. A start circuit 22 is used at initial start-up of power supply 10 to generate power to IC voltage supply 20; thereafter all power requirements are generated by IC voltage supply 20. A soft start circuit 23 is used in conjunction with start circuit 22 to provide a gradual increase of the power provided to IC voltage supply 20 at initial startup.

Because synchronization circuit 29 maintains precise control of the switching of the pulse trains for forward converter 100 and buck converter 200, the difference in voltage between the 5 V DC voltage ($V_{out1}$) and the 3.3 V DC voltage ($V_{out2}$) is relatively constant (i.e., about 1.7 V). However, at initial startup of the power supply, the difference between $V_{out1}$ and $V_{out2}$ can be greater than 1.7 due to the time required for $V_{out2}$ to reach its steady state. In some applications, a difference greater than 4.0 V can, damage the circuit driven by the power supply. Thus, a linear regulator 34 is connected between the output terminal 8d and the input to buck converter 200 to maintain the difference between the outputs below 2.0 V. Linear regulator 34 generally includes a simple resistor divider network which generates dissipated heat loss during operation, but only for the short period needed for $V_{out\,2}$ to reach its steady state value of 3.3 V. Linear regulator 34 includes a variable resistor (not shown) to allow adjustment of the desired regulation voltage.

Control and housekeeping circuitry 18 also includes an under voltage lockout (UVL) circuit 24 which senses the voltage level of the DC input voltage. If the voltage level is below a preselected threshold level, UVL circuit 24 generates a signal to IC supply voltage 20 to shutdown operation of the dual-output power supply 10. Similarly, an over voltage lockout (OVL) circuit 26 senses the voltage level of the $V_{out1}$ DC voltage. If the voltage level is greater than a predetermined maximum threshold, OVL circuit 26 determines that a fault exists in forward converter 100 or its control circuitry and generates a signal to IC supply voltage 20 to shutdown operation of the dual-output power supply 10. Trim/compensation circuits 28, 31 are connected to forward converter 100 and buck converter 200 to allow for adjustment of the amplitude levels of the $V_{out1}$ and $V_{out2}$ DC voltages via terminal pins 8f and 8c (FIG. 1A), respectively.

A current sensing circuit 30 is provided for sensing the current flowing through primary winding 104 on an ongoing basis. When the current exceeds a predetermined threshold value current sensing circuit 30 generates a control signal to control circuit 120 (via a second current limiting circuit 32) to suppress the generation of one of the square-wave pulses by transformer 106. If the value of the current is greater than the threshold for an extended period of time (e.g., a short circuit condition), second current limiting circuit 32 generates a signal to suppress the generation of a series of the square-wave pulses for a predetermined time period. At the end of the predetermined time period, the current is remeasured and, if below the threshold, the square-wave pulses from transformer 106 are reinitiated.

Other embodiments are within the claims. For example, the dual-output power supply 10 described above generates output voltages of 5 V and 3.3 V. The invention, however, is applicable to dual-output power supplies of other voltage combinations such as 3.3 V/2.5 V or 2.5 V/ 2.1 V supplies.

What is claimed is:

1. A multi-output power supply for generating first and second DC output voltages to respective loads, said power supply comprising:

a first converter which receives a DC input voltage and generates the first DC output voltage;

a first control circuit which controls the level of the first DC output voltage;

a second converter which receives the first DC output voltage from the first converter circuit and generates the second DC output voltage;

a second control circuit which controls the level of the second DC output voltage.

2. The multi-output power supply of claim 1 further comprising a housing within which the first converter, the second converter, the first control circuit and the second control circuit are disposed.

3. The multi-output power supply of claim 1 further comprising a synchronization circuit which applies the second control signal to the second converter at substantially the same time the first control signal is applied to the first converter.

4. The multi-output power supply of claim 1 further comprising circuitry connected to the first converter and second converter to maintain the difference between the first DC output voltage and the second DC output voltage below a predetermined threshold value.

5. The multi-output power supply of claim 4 wherein the circuitry includes a voltage regulator.

6. The multi-output power supply of claim 1 wherein the first converter is a forward converter and the second converter is a buck converter.

7. A multi-output power supply for generating first and second DC output voltages to respective ones of the loads at a predetermined total output current level, said power supply comprising:

a first converter which receives a DC input voltage and generates the first DC output voltage, the first converter, in operation, providing a first variable output current level in a range between zero and the predetermined total current level of the multi-output power supply;

a first control circuit which controls the level of the first DC output voltage and the first variable output current level;

a second converter which receives the first DC output voltage from the first converter circuit and generates the second DC output voltage, the second converter, in operation, providing a second variable output current level in a range between zero and the difference between the total current level of the multi-output power supply and the first variable current level; and a second control circuit which controls the level of the second DC output voltage and the second variable output current level.

8. The multi-output power supply of claim 7 further comprising a housing within which the first converter, the second converter, the first control circuit and the second control circuit are disposed.

9. The multi-output power supply of claim 7 further comprising a synchronization circuit disposed within the housing to ensure that the second control signal is applied to the second converter at substantially the same time the first control signal is applied to the first converter.

10. The multi-output power supply of claim 7 further comprising a voltage regulator circuit disposed within the housing and connected to the first converter and second converter to maintain the difference between the first DC output voltage and the second DC output voltage below a predetermined threshold value.

11. The multi-output power supply of claim 7 wherein the first converter is a forward converter and the second converter is a buck converter.

* * * * *